United States Patent [19]
Perlman et al.

[11] Patent Number: 5,941,589
[45] Date of Patent: Aug. 24, 1999

[54] CHOCK BLOCK HOLDER FOR INSTALLATION IN TRUCK BODIES

[75] Inventors: Daniel Perlman, Auburn; Jack O'Donnell, Lancaster; Jim DeTemple, Shillington, all of Pa.

[73] Assignee: Reading Body Works, Inc., Shillington, Pa.

[21] Appl. No.: 08/844,286

[22] Filed: Apr. 18, 1997

[51] Int. Cl.⁶ .................................................. B60R 9/02
[52] U.S. Cl. ................................................. 296/37.6
[58] Field of Search .................. 296/37.6, 37.1; 410/30

[56] References Cited

U.S. PATENT DOCUMENTS

| | | | |
|---|---|---|---|
| 3,081,126 | 3/1963 | Theberge | 296/37.1 |
| 4,109,955 | 8/1978 | Amann et al. | 296/37.1 |
| 4,830,421 | 5/1989 | Hawelka et al. | 296/37.6 X |
| 5,232,259 | 8/1993 | Booker | 296/37.6 |
| 5,251,947 | 10/1993 | Kirila, II et al. | 296/37.6 |
| 5,615,922 | 4/1997 | Blanchard | 296/37.6 |

*Primary Examiner*—Joseph D. Pape
*Attorney, Agent, or Firm*—Schnader Harrison Segal & Lewis LLP

[57] ABSTRACT

A chock block holder for installation in a vehicle body includes a hollow, generally triangular body having a central axis and having first and second ends, the first end being closed, and the second end being open, and a peripheral flange on the first end, the peripheral flange lying in a plane not perpendicular to the central axis. A method of storing a chock block in a vehicle body having a vertical side wall, includes the steps of placing a chock block holder in the form of a hollow, generally triangular body having a central axis, and first and second ends, the first end being closed, and the second end being open and having a peripheral flange on the first end, the peripheral flange lying in a plane not perpendicular to the central axis, in an opening in the side wall so that the flange is in contact with the side wall and the first end is downward from the second end; and fastening the flange to the side wall.

10 Claims, 5 Drawing Sheets

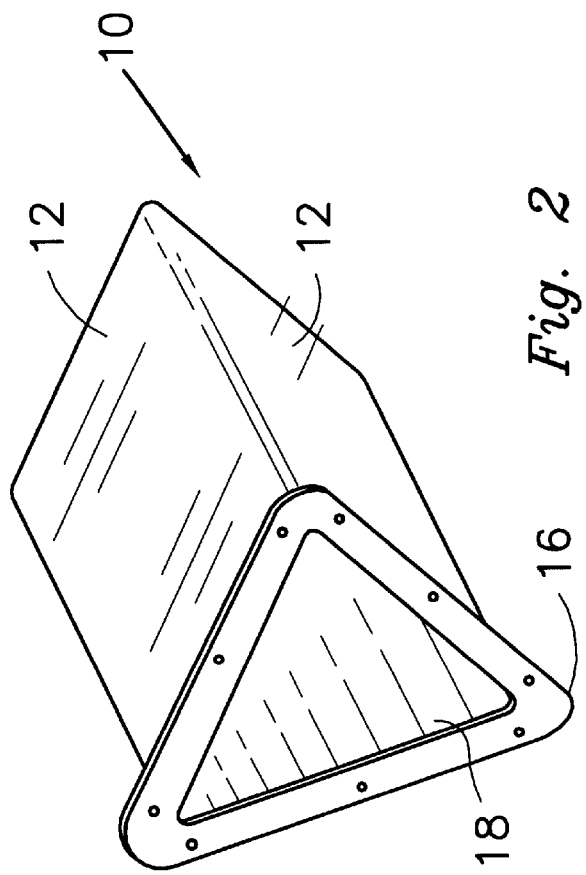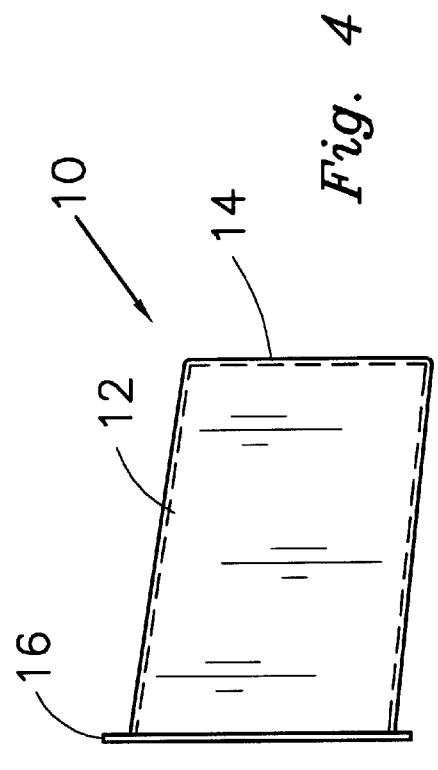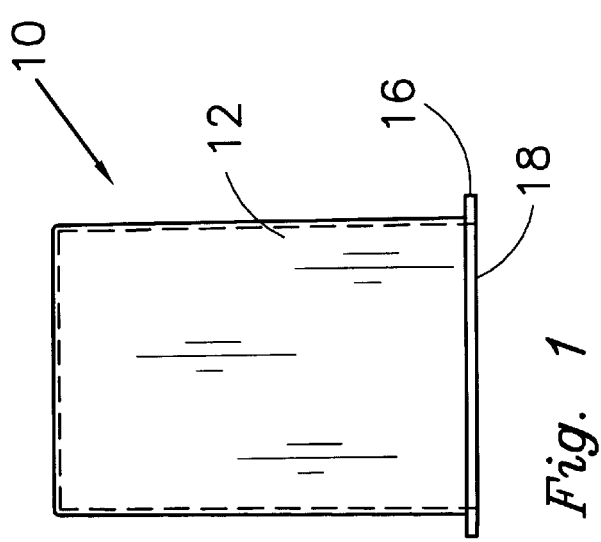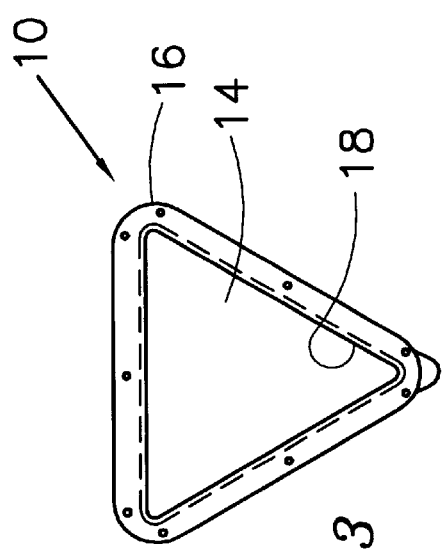

CHOCK BLOCK HOLDER FOR INSTALLATION IN TRUCK BODIES

BACKGROUND AND FIELD OF THE INVENTION

This invention pertains to truck bodies, and particularly to chock block holders for truck bodies.

Chock blocks are large blocks, generally of metal, that are used as chocks for placement next to vehicle wheels to prevent vehicles from rolling when parked on hills or rough terrain. Chock blocks are particularly important to trucks used by electric and other utilities, tree surgeons, and others who have cherry pickers mounted on the trucks for work on overhead wires and removal of tree limbs. Often, trucks must be parked on hills or on uneven ground in order to provide access the wires or tree limbs to be reached. While personnel are in the cherry pickers, any movement of the truck presents a risk of injury to the personnel, as well as disruption of the task being performed.

Such trucks conventionally have somewhat specialized truck bodies formed primarily of sheet metal. The truck bodies are conventionally equipped with recesses for holding chock blocks. These recesses are conventionally formed of pieces of sheet metal that are fastened together.

There are various problems associated with the chock block recesses of the prior art. These recesses, as they are composed of pieces of sheet metal that have been fastened or welded together, are subject to stresses along seams and joints, denting on the sheet metal pieces, and require maintenance as a result. Also, water from rain may build up in the recesses, and as the sheet metal parts are generally of steel, the water can contribute to rusting of the truck body.

OBJECTS AND ADVANTAGES OF THE INVENTION

It is an object of the invention to provide a chock block holder for vehicle bodies that is not prone to rust and stresses along seams.

It is an object of the invention to provide a method for installation in a vehicle body of a chock block holder that is not prone to rust and stresses along seams.

It is an object of the invention to provide a vehicle body having a chock block holder that is not prone to rust and stresses along seams.

It is an advantage of the invention that it provides a chock block holder for vehicle bodies that is not prone to rust and stresses along seams.

It is an advantage of the invention that it provides a method for installation in a vehicle body of a chock block holder that is not prone to rust and stresses along seams.

It is an advantage of the invention that it provides a vehicle body having a chock block holder that is not prone to rust and stresses along seams.

Additional objects and advantages of the invention will be apparent from the detailed description of a preferred embodiment which follows.

SUMMARY OF THE INVENTION

A chock block holder for installation in a vehicle body includes a hollow, generally triangular body having a central axis and having first and second ends, the first end being closed, and the second end being open, and a peripheral flange on the first end, the peripheral flange lying in a plane not perpendicular to the central axis.

A method of storing a chock block in a vehicle body having a vertical side wall, includes the steps of placing a chock block holder in the form of a hollow, generally triangular body having a central axis, and first and second ends, the first end being closed, and the second end being open and having a peripheral flange on the first end, the peripheral flange lying in a plane not perpendicular to said central axis, in an opening in the side wall so that the flange is in contact with said side wall and the first end is downward from the second end; and fastening the flange to the side wall.

A truck body includes a hollow enclosure having a planar vertical outer side wall, a planar vertical fender panel extending downward from the side wall of the enclosure, an opening being defined in the fender panel; and a chock block holder in the form of a hollow, generally triangular body having a central axis, first and second ends, the first end being closed, and the second end being open and a peripheral flange on the first end, the peripheral flange lying in a plane not perpendicular to the central axis, in the opening so that the flange is in contact with and fastened to the fender panel and the second end is downward from the first end.

BRIEF DESCRIPTION OF THE FIGURES

FIG. 1 is a top view of a chock block holder in accordance with the invention.

FIG. 2 is an isometric view of a chock block holder in accordance with the invention.

FIG. 3 is a front view of a chock block holder in accordance with the invention.

FIG. 4 is a side view of a chock block holder in accordance with the invention.

DETAILED DESCRIPTION OF A PREFERRED EMBODIMENT

Figure 5:
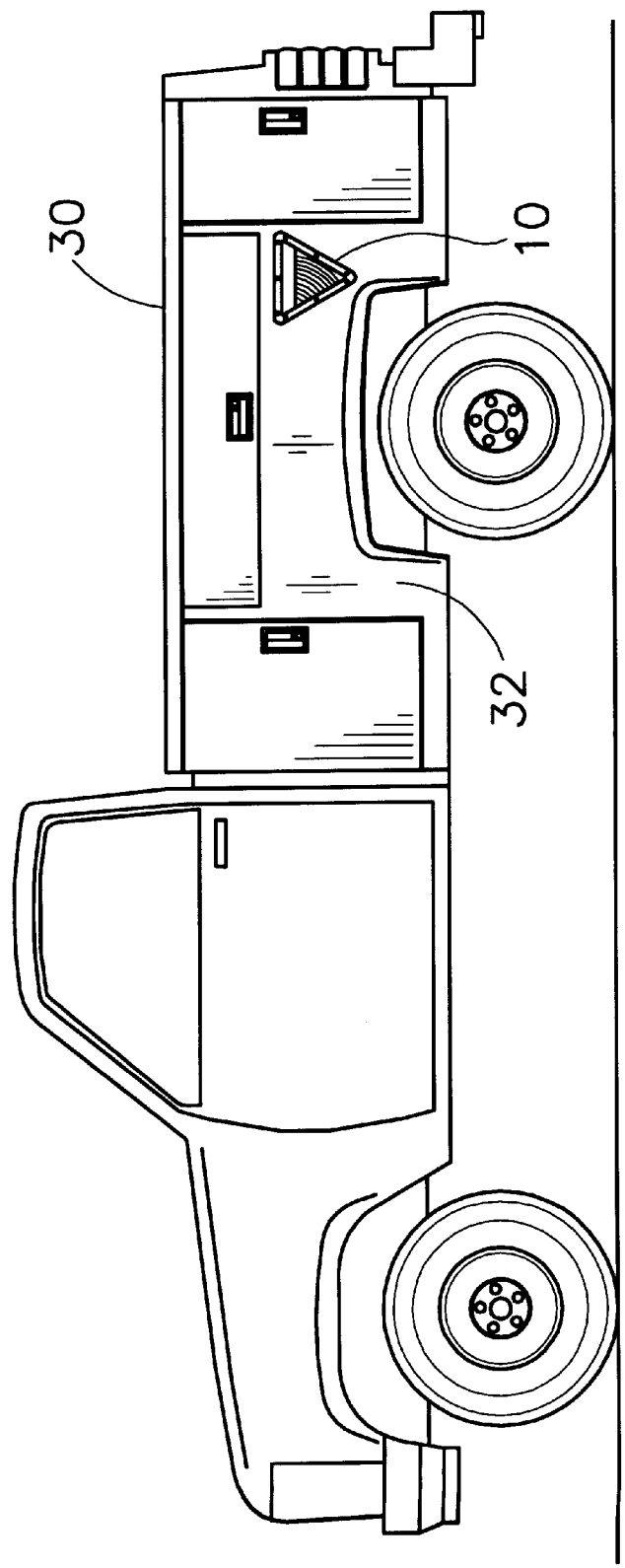
FIG. 5 is a side view of a truck having a truck body in accordance with the invention and a chock block holder in accordance with the invention installed therein.

Referring to FIGS. 1—4, there is shown a chock block holder 10 according to the present invention. Chock block holder 10 is preferably made of a single piece of cast aluminum. Chock block holder 10 is generally in the form of an equilateral triangle in cross-section, having one closed end and one open end. Chock block holder 10 therefore has three generally planar sides 12, a generally planer end 14, and a peripheral lip 16 protruding outward around an opening 18 defined in the end opposite to end 14. Sides 12 are symmetrically located about a central axis. The central axis is a few degrees from perpendicular with the plane in which end 14 and lip 16 lie.

Chock block holder 10 can be installed in the fender area 32 of truck body 30, shown in FIG. 5. The fender area 32 is a planar vertical side wall of truck body 30. As will be readily understood, lip 16 may be fastened to the fender area 32 of truck body 30 by appropriate fasteners. Holes are provided through lip 16 for this purpose. As lip 16 will lie in a vertical plane, when holder 10 is properly positioned, holder 10 will tilt downward to end 14. The closed end will be at a lower level than the open end. As a result, a chock block placed in holder 10 will not easily slide out accidentally.

Figure 6:
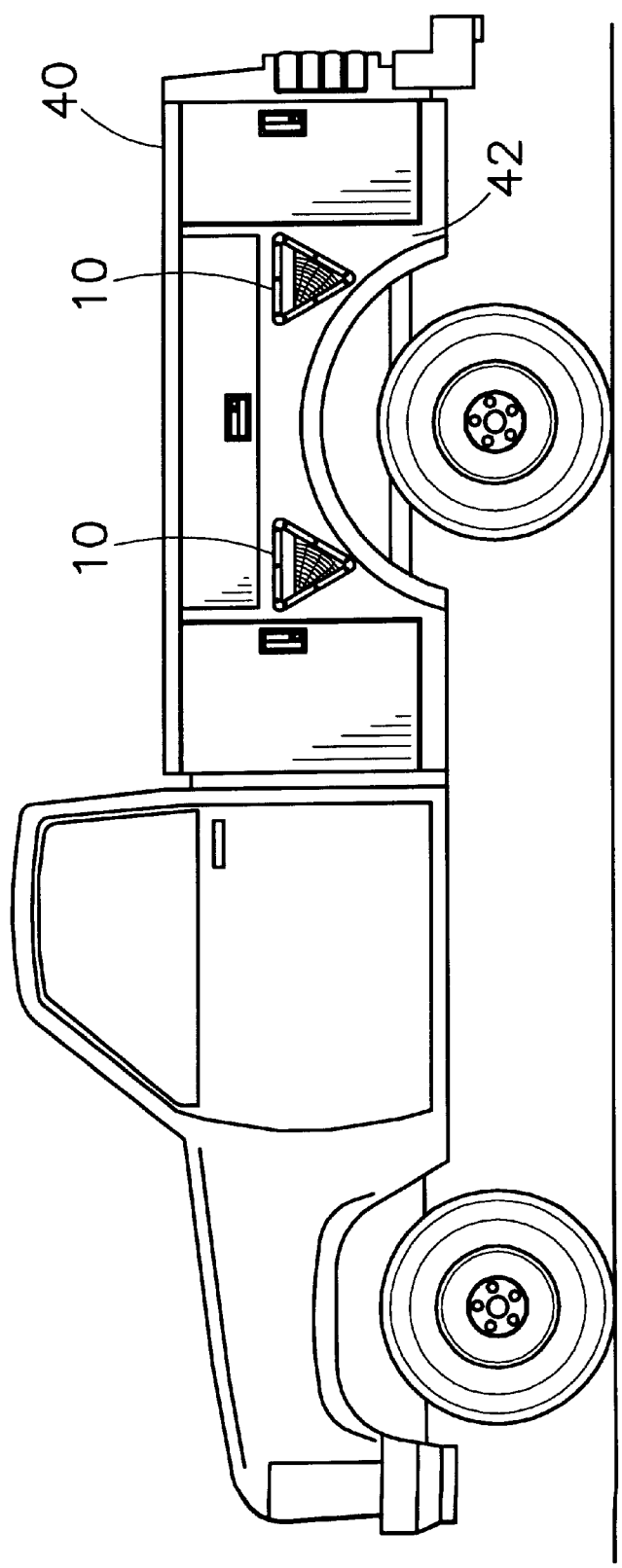
FIG. 6 is a side view similar to FIG. 5 showing two chock block holders installed in the truck body.

In FIG. 6, two chock block holders 10 are installed in fender panel 42 of truck body 40. Because of the symmetrical form of chock block holder 10, it can be placed either at the forward corner or the rearward corner of fender panel 42.

Figure 7:
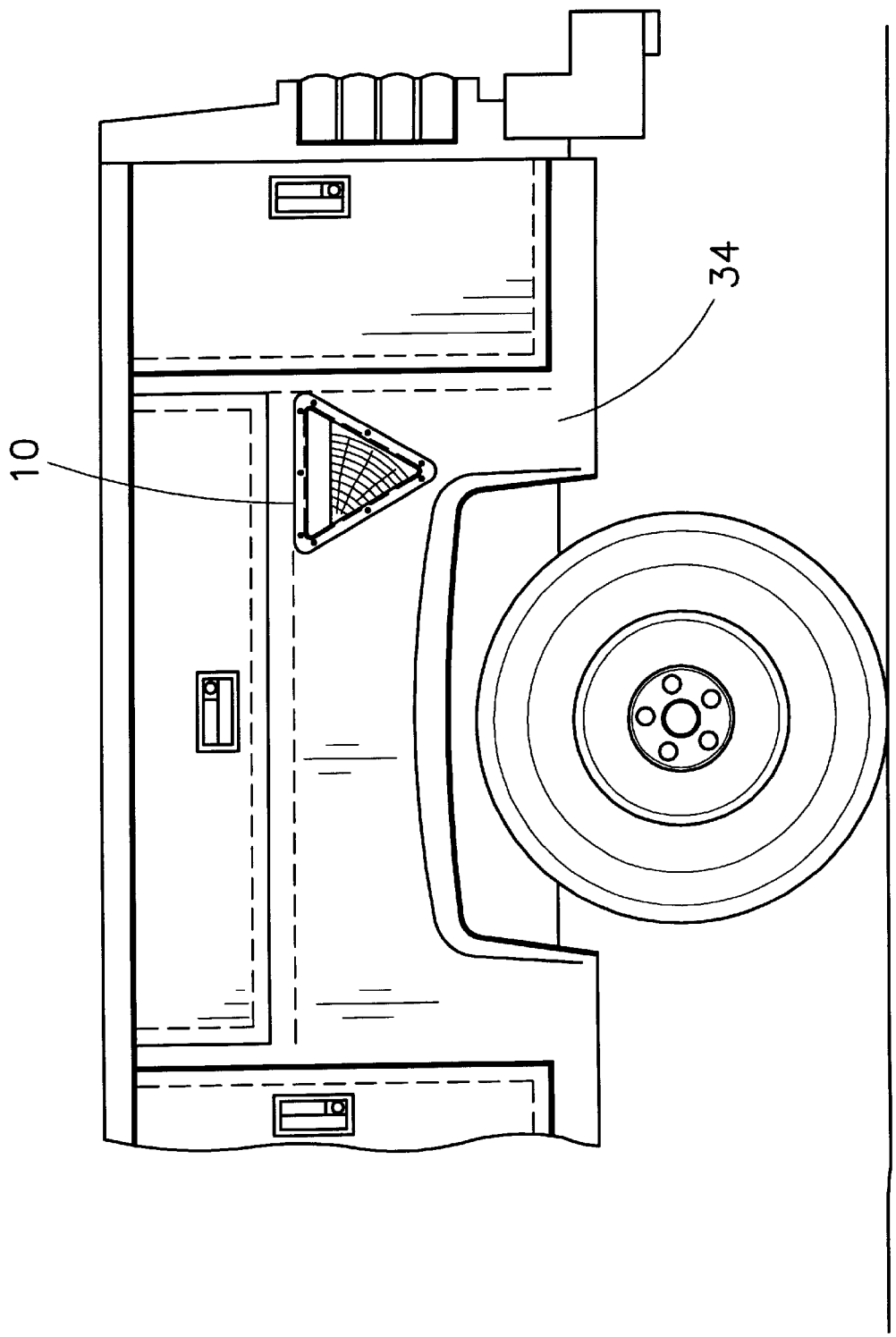
FIG. 7 is an enlarged partial side view of the truck body of FIG. 5.

In FIG. 7, separate fender panel 34 of truck body 30 of FIG. 5 is shown with edges shown in dashed lines. Chock block holder 10 is placed at one corner of fender panel 34. As a result, an opening can be formed generally at the corner of the fender panel for installation of chock block holder 10.

Figure 8:
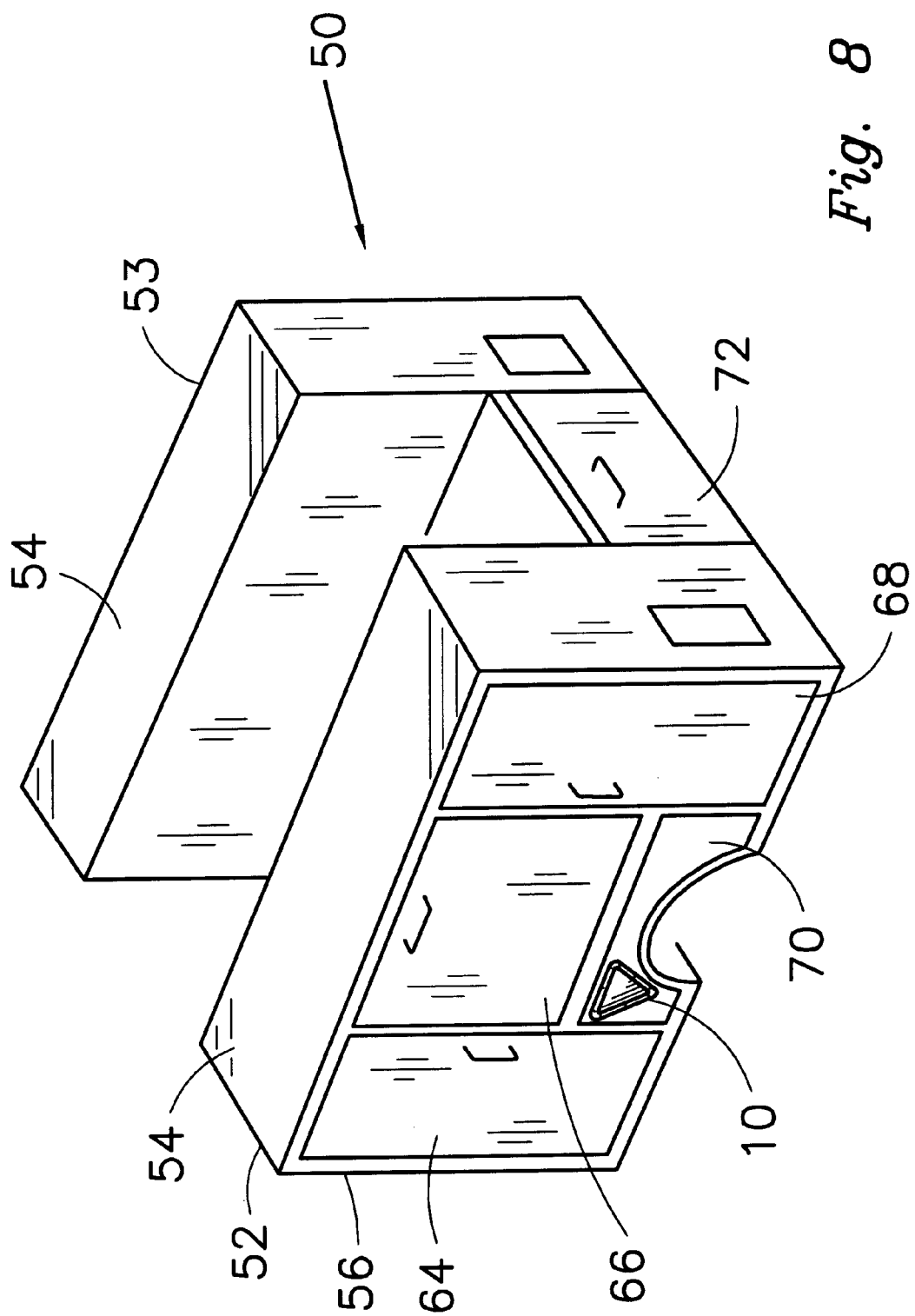
FIG. 8 is a somewhat schematic isometric view of a truck body according to the invention.

Referring to FIG. 8, there is shown a conventional truck body 50. Truck body 50 has two hollow enclosures, each defined by top panel 54, outer side of panel 56 inner side panel 58, front panel 60, and rear panel 62. The enclosure is divided into three separate compartments 64, 66 and 68, each of which has a separate door 72, 74, 76. A chock holder 10 according to the invention is shown inserted and fastened to fender area 78 of the exterior side of the truck body 50.

There are numerous advantages associated with the chock block holder 10 according to the invention. Installation is very simple. An appropriate size opening is cut into the fender panel of the truck body. The chock block holder 10, which is precast, is then simply inserted through the opening. The chock block holder 10 is then fastened to the fender panel of the truck body by fasteners which may be inserted through holes provided through lip 16. As the holders are made of a single piece of cast aluminum, they are not prone to damage or separation at seams, need not be finished, and are not susceptible to rust.

The following dimensions are for an exemplary embodiment of the invention. The interior width of each side wall 12 is about 11 inches at the open end, and the holder may be slightly tapered, so that the width of each side wall 12 is about 10½ inches at the closed end. The depth of the holder 10 from lip 16 to wall 14, measured on a line perpendicular to the plane in which lip 16 lies is about 13¾ inches. The width of lip 16 is about one inch. The change in position of the top one of side walls 12 measured parallel to the plane in which lip 16 lies from the open end to the closed end is about 1 13/16 inches. The angle between the central axis and the plane in which lip 16 lies is about 7.5 degrees. The foregoing dimensions are purely exemplary.

It will be appreciated that there are considerable variations that can be accomplished in an article and method according to the invention without departing from its scope. As a result, although a preferred embodiment of an article and method of the invention has been described above, it is emphasized that the invention is not limited to a preferred embodiment and there exists other alternative embodiments that are fully encompassed within the invention's scope, which is intended to be limited only by the scope of the appended claims.

What is claimed is:

1. A chock block holder for installation in a vehicle body, comprising:

a. an elongated hollow, generally triangular body having a central axis and having first and second ends, said first end being closed, and said second end being open and substantially unobstructed such that a chock block of similar shape and size may be inserted into an interior portion thereof; and b. a peripheral flange on said second end, said peripheral flange lying in a plane not perpendicular to said central axis.

2. The chock block holder of claim 1, wherein said body is formed of a unitary piece of metal.

3. The chock block holder of claim 1, wherein the transverse cross-section of said body is substantially an equilateral triangle.

4. The chock block holder of claim 1, wherein the angle between said plane and said axis is about 7.5 degrees.

5. A method of storing a chock block in a vehicle body having a vertical side wall, comprising the steps of:

a. placing a chock block holder in the form of a hollow, generally triangular body having a central axis, first and second ends, said first end being closed, sand said second end being open and substantially unobstructed such that a chock block of similar shape and size may be inserted into an interior portion thereof, and a peripheral flange on said second end, said peripheral flange lying in a plane not perpendicular to said central axis, in an opening in said side wall so that said flange is in contact with said side wall and said first end is downward from said second end; and b. fastening said flange to said side wall.

6. The method of claim 5, wherein said step of fastening comprises placing fasteners through holes defined in said flange and through said side wall.

7. A truck body, comprising:

a. a hollow enclosure having a planar vertical outer side wall, b. a planar vertical fender panel extending downward from said side wall of said enclosure, an opening being defined in said fender panel; and c. a chock block holder in the form of a hollow, generally triangular body having a central axis, first and second ends, said first end being closed, and said second end being open and a peripheral flange on said second end, said peripheral flange lying in a plane not perpendicular to said central axis, in said opening so that said flange is in contact with and fastened to said fender panel and said first end is downward from said second end.

8. The truck body of claim 7, wherein said holder is formed of a unitary piece of metal.

9. The truck body of claim 7, wherein the transverse cross-section of said holder is substantially an equilateral triangle.

10. The truck body of claim 7, wherein the angle between said plane and said central axis is about 7.5 degrees.

* * * * *